United States Patent [19]

Froeschke et al.

[11] Patent Number: 5,401,938

[45] Date of Patent: Mar. 28, 1995

[54] ROTARY DROP FORMER WITH ELECTRICAL INDUCTIVE HEATER

[75] Inventors: Reinhard Froeschke, Weinstadt-Beutelsbach; Stefan Gehrmann, Backnang-Heiningen, both of Germany

[73] Assignee: Santrade Ltd., Luzern, Switzerland

[21] Appl. No.: 150,110

[22] Filed: Nov. 24, 1993

[30] Foreign Application Priority Data

Mar. 31, 1992 [WO] WIPO ............... PCT/EP92/00711

[51] Int. Cl.⁶ ............................................. H05B 6/10
[52] U.S. Cl. ............................ 219/602; 219/618; 219/628; 219/652; 219/679; 425/378.1; 425/174.8 R; 425/6; 264/140
[58] Field of Search ............... 219/618, 619, 602, 628, 219/629, 630, 631, 632, 652, 674, 677; 425/6, 8, 174.8 R, 378.1, 382 R, 381, 381.2; 264/140, 141

[56] References Cited

U.S. PATENT DOCUMENTS

| | | | |
|---|---|---|---|
| 2,411,409 | 11/1946 | Ballard | 219/632 |
| 2,875,311 | 2/1959 | Harkenrider | 219/618 |
| 3,387,783 | 6/1968 | Schellenberg et al. | |
| 3,912,799 | 10/1975 | Chisholm | 264/25 |
| 4,277,436 | 7/1981 | Shah et al. | 264/518 |
| 4,279,579 | 7/1981 | Froeschke | |
| 4,304,975 | 12/1981 | Lenk et al. | 219/619 |
| 4,559,000 | 12/1985 | Froeschke | 425/6 |
| 4,590,347 | 5/1986 | Thatcher et al. | 219/632 |
| 4,885,447 | 12/1989 | Sanchez Gonzalez | |
| 4,963,084 | 10/1990 | Froeschke | |
| 4,976,907 | 12/1990 | Brotz | 264/140 |
| 5,198,233 | 3/1993 | Kaiser | |

FOREIGN PATENT DOCUMENTS

| | | |
|---|---|---|
| 0059421 | 9/1982 | European Pat. Off. |
| 3342889 | 6/1985 | Germany |
| 3704581 | 9/1988 | Germany |
| 3710085 | 10/1988 | Germany |
| 772424 | 4/1957 | United Kingdom |

Primary Examiner—Philip H. Leung
Attorney, Agent, or Firm—Burns, Doane, Swecker & Mathis

[57] ABSTRACT

A drop former includes an outer rotary steel body having circumferentially spaced openings which successively reach a lower discharge position to enable viscous material to drop onto a cooling conveyor from within the outer body. An inner steel body, which can be stationary or rotating, is situated within the outer body to direct viscous material to the openings as the openings reach the discharge portion. An electrical inductive heating coil is situated adjacent one or both of the bodies to inductively heat the body, avoiding excessive heating of the viscous material.

20 Claims, 2 Drawing Sheets

ROTARY DROP FORMER WITH ELECTRICAL INDUCTIVE HEATER

BACKGROUND OF THE INVENTION

The invention refers to a device to form drops from viscous, flowing masses that are arranged in a container with at least one steel wall equipped with several rows of openings, and that can be cyclically extruded in drop form through one row of openings at any given time, as soon as this row, during movement of the wall, comes into alignment with an aperture exit area that is not rotating along with the wall, whereby for heating the masses remaining in the openings, at least one heating installation is associated with the wall and/or the exit area.

Devices of this type are known (DE-PS 28 53 054 and DE-PS 29 41 802). These devices equipped with rotating outer tubes have the considerable advantage that they can form tablets fairly easily and at a high rate from masses that could otherwise only be deposited in layers on cooling conveyors and that would then cause environmentally harmful dust development when being broken up into pieces.

It is also known that due to their viscosity, the drops emerging from the rows of holes to then become tablets on the cooling conveyor form threads connected to the mass remaining in the openings. If they do not tear off in timely manner, these threads then became deposited, during the continuing rotation, on the periphery of the rotating container tube. Efforts have been made to return non-deposited mass back into the container. One such proposal involves arranging eccentric gaps in the container, through which the mass is sucked back in. Also known are guides adjacent to the container periphery, which are heated and with the help of which the material adhering to the periphery is pressed back into the drip openings. In any case, a precondition is that the mass moved back should be sufficiently reheated to be flowable enough for a return procedure and for the renewed drip procedure.

The rotating tubes have generally been made of stainless steel for reasons of corrosion and wear. Since this material has very poor sliding properties, however, a gap was usually created between the stationary inside container and the rotating tube. Since the heating of such rotary formers takes place by heating the inner stationary body, with many products it occurs that the outer rotating container and the remaining masses adhering to it cool off excessively, in such a way that the threads stretching from the drops deposited on the cooling conveyor to the rotating outer surface of the container do not always tear off and onto the drops formed. A flawless, dust-free granulation is therefore not always possible with such materials.

It has also been shown that the temperature increase in the inside of the stationary body cannot be set as high as desired in order to sufficiently heat up the rotating outer tube. In addition, materials must also be worked that cannot be heated too high due to danger of explosion. This restricts the use of heaters arranged outside the rotating tube as well.

Similar problems can also occur with other granulating installations where the viscous material is extruded between an extrusion roller arranged inside a rotating roller body and the outer roller, with the help of serrated slats attached to the inside periphery of the outer roller and the outer periphery of the extrusion roller (DE-OS 36 15 677), or in which a rotating belt provided with openings is attached to a stationary nozzle lip (DE-PS 33 27 479).

The task of the present invention is thus to design a device of the type mentioned in the beginning in such a way that heating the moving wall to the required degree is possible with no danger of damaging the product through overheating or of reaching its fire point or the ignition temperature.

SUMMARY OF THE INVENTION

To solve this task, it is proposed, in a device of the type mentioned in the beginning, that the heating installation be an inductively operating heating. This heating installation is preferably equipped, in the manner of an induction hardening system, with an induction coil that is attached to the container wall and that can be designed as a transfer tube with coolant running through it.

With the inductive heating, the moving wall part or exit area part made of stainless steel or other suitable materials can be heated up relatively simply and in accurately controllable manner, without the temperature of the heating installation itself rising too high. As is known in the case of induction hardening, the transfer coil can be cooled in such a way that it does not permit temperatures to become too high. By selection of the induction flow, on the other hand, heating can be carried out quite easily.

In a drop-former of the type mentioned in the beginning, with a stationary inside container and a tubular container rotating around it, and in which the exit area is situated at the intersection of a vertical plane with the lower half of the container, it would be advantageous to arrange the transfer tube behind the exit area in the container's turning direction, and to provide behind the transfer tube in the container's turning direction, a guide body that can be laid against the container periphery, for the residual material remaining on the periphery.

In a drop-former of the type mentioned in the beginning, with a container equipped with axially running serrated slats on its inside periphery and an extrusion roller attached to its inside and equipped with corresponding serrated slats on its outer periphery, it would be advantageous to have the transfer tube attached to the extrusion roller, and to have the transfer tube arranged inside an extrusion roller designed as a hollow roller. This makes it possible, even with such an extrusion installation, to achieve a fine tempering of the inside extrusion roller, in particular near the exit area, and to make sure that at that point, the viscosity of the mass extruded to form drops attains the value best suited for the desired forming of drops. Of course, a heating according to the invention can also be attached to a rotating belt or the fixed exit part working with this belt, as long as the belt is made of an inductively heatable material, e.g.; steel.

BRIEF DESCRIPTION OF THE INVENTION

The drawing shows two forms of construction of the invention, which are explained below: FIG. 1 shows a diagram cross-section of a drop-former according to the invention with a stationary inside container and a perforated outside container rotating around it, FIG. 2 shows the diagram of the drop-former of FIG. 1 in a top-view with the induction coil to heat the outer tube, but in reduced scale, FIG. 3 shows a cross-section similar to FIG. 1, but it is of an installation with a rotating outer container with serrated slats inside, and an extrusion roller inside the outer container, with serrated slats outside, FIG. 4 shows a longitudinal section of the two rotating rollers of FIG. 3.

DETAILED DESCRIPTION OF PREFERRED EMBODIMENTS OF THE INVENTION

Figure 1:
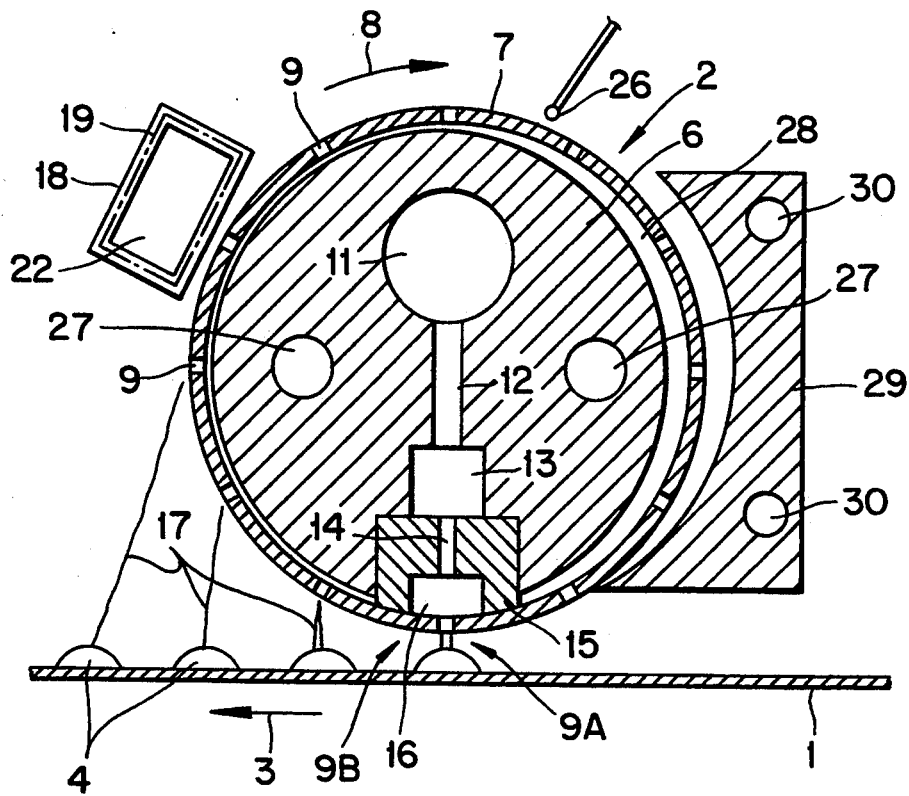
Figure 2:
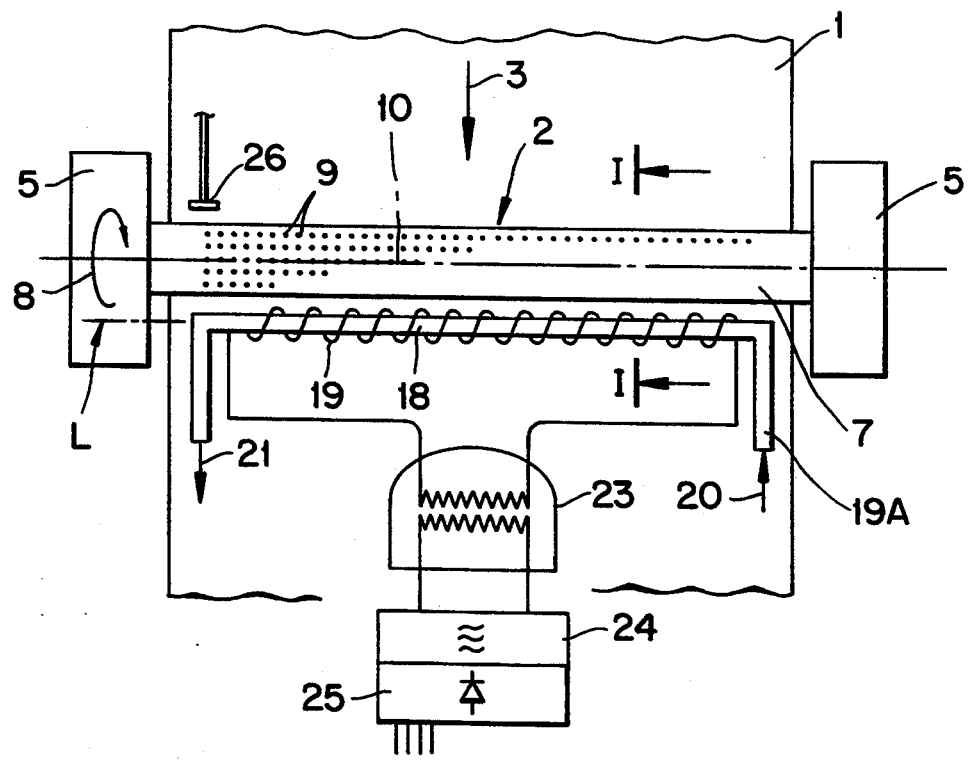

In FIGS. 1 and 2, of which FIG. 1 shows a lengthwise section along Line I—I of FIG. 2 but in greatly enlarged scale, a drop-former (2) is arranged above a conveyor belt (1) designed as the cooling conveyor. The cooling conveyor (1) is moved in the direction of the arrow (3) and receives the material dripping out of the drop-former in the form of tablets (4) that increasingly solidify as the cooling conveyor (1) continues to move in the direction of the arrow (3) and that can then be removed from the belt.

The drop-former (2) consists of a cylindrical inside body or container (6) arranged fixed (in a manner not shown in detail) in stands (5) arranged at the side of the cooling conveyor (1). Around this body, a cylindrical, tubular outer body of container (7) is arranged rotatable. This body is received in bearings (also not shown in detail) in the stands (5) and can be shifted by a motor in rotation in the direction of the arrow (8) of FIG. 2. This type of design of a drop-former is basically known and therefore not described in greater detail.

The bodies (6,7) form a containing structure for the viscous material.

On its entire periphery, the rotatable, cylindrical outer container (7) has continuous openings (9) that run along longitudinal surface lines of the container (7) in rows parallel to the rotation axis (10). The stationary inside body (6) has an axial feed opening (11) for the material to be dripped, which is fed in flowing form to this canal (11) in a manner also not shown in greater detail because it is already known. This viscous material to be dripped then makes its way through several branch canals (12) to a chamber (13) also running parallel to the axis (10). From there, it can be forwarded via bores (14) to a nozzle lip (15) and to a groove-like exit area (16) of the nozzle lip (15). From there, when the rows of openings (9) cyclically reach a discharge position in which they are in alignment with the exit area (16), reach a discharge position in which they are in alignment with drips out of the rows of openings onto the cooling conveyor (1). The feed of the material to the openings (9) is completed as soon as the rows of openings reach the rear edge of the nozzle lip (15) in turning direction (8). In the process, however, partly because of the viscosity of the material to be dripped, threads (17) form. These should then tear off as the outer container (7) continues to move and, because the turning direction (8) and the direction of movement (3) of the cooling conveyor can be correspondingly selected and coordinated with each other, the threads should then sink back into the tablet-like piles (4) of material on the cooling conveyor (1) and should, as a rule, melt together with the material.

Depending on the material to be dripped, however, one cannot always prevent residual threads from remaining stuck on the outer periphery of the rotating container (7); above all, residual material remains in the openings (9) themselves. If one does not see to it that on its way to the next alignment with the nozzle lip (15), this residual material is either guided back into the inside or is at least prepared in such a way that it remains able to drip, this can impede the operation of the dropformer. Namely, the openings may get stopped up over time in such a way that production has to be interrupted.

The drop-former (2) of FIG.1 and 2 is therefore equipped with an induction coil (18) which, in the example of construction, includes a straight tube (19A) which extends essentially parallel to a longitudal surface line of the rotating container (2) and around which electrical coils (19) are wound. The induction coil rod formed in this way is designed as a hollow tube (19A) and can—in generally known manner—be supplied in the direction of the arrow (20) of FIG.2 with a coolant that reemerges after flowing through the hollow space (22) in the direction of the arrow (21). In the process, the coil (19) itself is operated in the known manner of a work coil of an induction hardening system, whereby the rotating outer container (7) corresponds to the work piece and the coil (19) is connected via a high-frequency transformer (23) to a high-frequency part (24), which is in turn equipped with a power supply part (25). The coil 19 forms a longitudinal axis L extending parallel to the axis 10 of the drop former. Also associated with the rotating outer container (7) is a temperature sensor (26) whose sensor part is arranged near the periphery of the container (2). Via this sensor (26), the degree of heating or the temperature of the container (2) can be detected and controlled. Since the rotating container (2) is made of stainless steel as usual, it can be easily heated up inductively. The temperature reached can be measured and adjusted via the temperature sensor (26). In the process, it is advantageous for the transfer part (18) serving as work coil to be able to be kept at a very low temperature by the possible cooling, in such a way that requirements, e.g., for explosion-proofness, can be easily met. It is also possible to control the temperature of the tube (7) exactly as required for the product to be extruded.

In the selected form of construction, the stationary inside container (6) can also be made of stainless steel. With a circulatory gap (28) between it and the rotating outer container (7). Thus, the inside container (6), which can also be provided in known manner with additional heating possibilities, e.g., in the form of heating canals (27) with heating oil flowing through them, can also be heated inductively. This heating can also take place in controlled manner via the temperature sensor (26).

The selected form of construction also makes it possible to heat up the drop-former (2) in the area of the rotating container (7) and opposing the outer areas, of the inside container (6) in such a way that the residual material remaining in the openings (9) after leaving the exit area (16) can be sucked back into the eccentric gap (28) between the inside container (6) and the outer container (7), in such a way that from there, before reaching the exit area (16) the material goes back into the openings. That sucked-in material is then released, in the exit area (16) as a new drop onto the cooling conveyor (1).

The lower discharge position successively reached by the openings (9) has a leading side 9A (located to the right of the lower discharge position in FIG. 1) and a trailing side 9B (located to the left of the lower discharge position in FIG. 1). The heater 18 is located closer to the leading side than to the trailing side.

For additional certainty, a guide body (29) is also associated with the outer periphery of the container (7), which also makes sure mechanically that any material still sticking on the periphery is pressed back into the openings (9) before the exit area (16) is reached. The guide body (29) is heated. It can, for example, be equipped with flow canals (30) heating oil to flow through, or it can be inductively heated.

Figure 3:
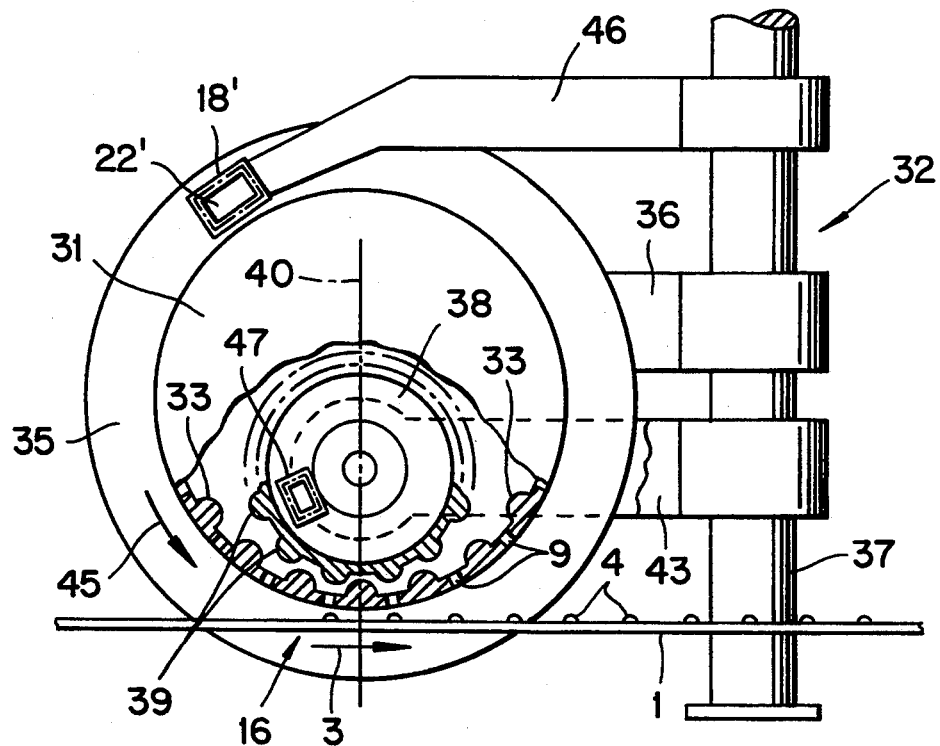
Figure 4:
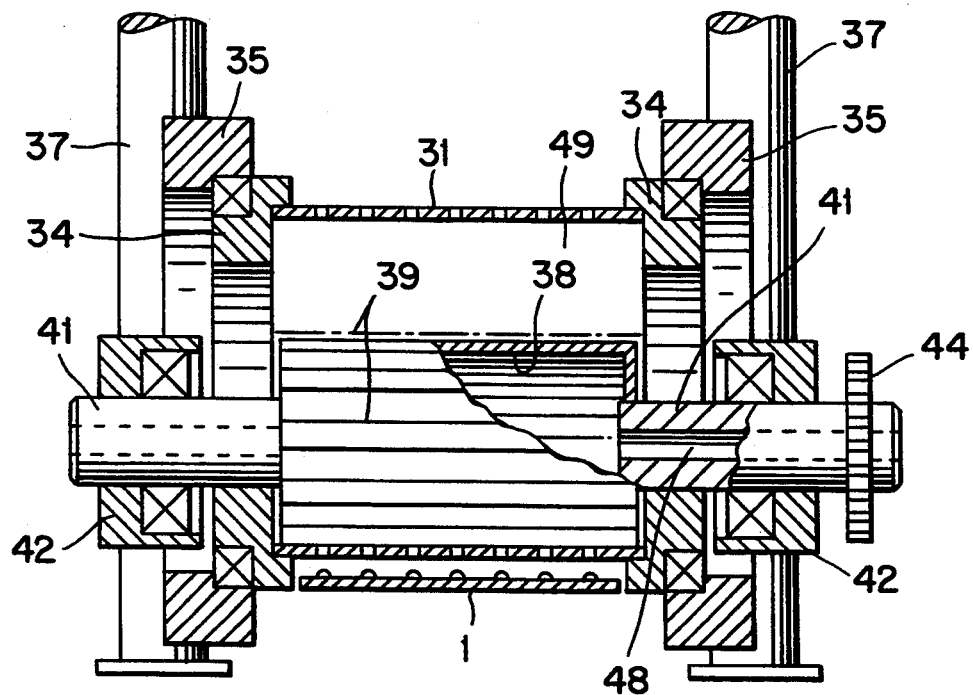

FIGS. 3 and 4 show another example of construction, in which the warming of a rotating outer body and/or a rotating inner body also takes place inductively. In FIGS. 3 and 4, above the cooling conveyor (1) moved in the direction of the arrow (3), a cylindrical tube or roller (31) is arranged on a frame (32); the cylindrical roller is provided with axially running serrated slats (33) over its entire inner periphery. Between every two adjacent serrated slats are the openings (9) which, in the same way as in the form of construction of FIG. 1, are each arranged into rows of openings running along a longitudinal surface line. This extrusion roller (31), which is held at each of its ends in a ring bearing (34) according to FIG. 4 and, of course, can have a greater axial length than shown in FIG. 4, is arranged via its ring bearings (34) in retaining rings (35) which in turn are held via support arms (36) on carrier columns (37) of the frame (32).

Inside the rotating outer roller (31), a rotating extrusion roller (38) is arranged that is provided with serrated slats (39) over its entire outer periphery. These serrated slats correspond to the serrated slats (33) of the outer roller (31) and engage these in the area of a vertical plane (40) that extends perpendicularly to the cooling conveyor (1) for directing material to the openings (9). The extrusion roller (38) is designed hollow and arranged in ring bearings (42) with bearing necks (41) protruding on both sides. These ring bearings are in turn attached via support arms (43) to the columns (37). One of the bearing necks is provided with a drive pinion (44) in such a way that via this drive pinion (44), the extrusion roller (38) and the outer roller (31) engaging it can be driven to rotate in the direction of the arrow (45). As in the form of construction in FIG. 1, the turning direction of the two rollers (31 and 38) is selected in such a way that the resulting movement at their lower portions coincides with the direction of movement (3) of the cooling conveyor (1).

The rollers (31,38) form a container assembly for the viscous material. Similar to the form of construction in FIGS. 1 and 2, the outer roller (31) has an induction coil (18′) associated with it which has, in the same way, a hollow space (22′) with coolant flowing through it and the coil arrangement according to FIG. 2. The coil arrangement is not shown in detail again. The induction coil (18′) is attached to the columns (37) via retaining arms (46). In the process, the retaining arms (46) can also be designed as feed pipes for the coolant and can be provided with electric supply cables.

In this form of construction, however, the extrusion roller (38) also has an induction coil (47) associated with it whose lines for electric power as well as for the coolant are laid (in a manner not shown in greater detail) inside the hollow extrusion roller (38) and inside the shaft stumps (41) equipped with axially running bores (48). Thus, if the outer roller (31) and the extrusion roller (38) are made of a ferritic material, e.g., of carbon-containing steel or of iron, one can achieve in a very sensitive manner, even in such a form of construction, a heating and tempering of the rotating bodies engaged together and thereby also of the material to be extruded, which is inserted axially into the intermediate space (49) between extrusion roller (38) and outer roller (31). In this form of construction, the material behind the exit area (16), which corresponds to the area of the vertical plane (40) above the cooling conveyor (1), is sucked back into the openings (9) through the serrated slats moving away from each other. This occurs only if the material is kept sufficiently flowable, however. It is therefore important to heat the outer roller (31) in this example as well. The arrangement of the induction coil (47) also introduces the considerable advantage that heating is also possible in the area situated shortly before the exit area (16), in such a way that at the exit points, one can achieve and maintain exactly that viscosity of the material to be extruded that is best for the desired drop formation. Of course, in the form of construction of FIG. 3 and 4, a temperature sensor to control heating can also be associated with the outer roller and/or the inner roller. It is also possible to arrange an induction coil associated with the extrusion roller (38) in the intermediate space (49) between extrusion roller (38) and outer roller (31) instead of, or in addition to, the induction coil (47) arranged inside the roller (38).

We claim:

1. Apparatus for forming drops of a flowable viscous material, comprising:
   a tubular outer body rotatable about a longitudinal axis of rotation and having circumferentially spaced openings which successively reach a discharge position during rotation of said outer body, for admitting a downward flow of said material from within said outer body;
   an inner body disposed within said outer body and arranged to direct said material to said openings at said discharge position;
   at least one of said bodies comprising an electrical inductively heatable material; and
   electrical inductive heating means arranged adjacent to one of said bodies for inductively heating said one body, said electrical inductive heating means comprising a helical electrical coil defining a longitudinal axis arranged parallel to said axis of rotation, and a tube for conducting a cooling fluid, said coil being wound around said tube.

2. Apparatus according to claim 1, wherein said outer body constitutes said one body, and said electrical inductive heating means is disposed adjacent said outer body.

3. Apparatus according to claim 2, wherein said electrical inductive heating means is disposed adjacent an outer peripheral surface of said outer body.

4. Apparatus according to claim 3, wherein said inner body is formed of an electrical inductively heatable material, and an additional electrical inductive heating means is disposed inside of said outer body and adjacent said inner body.

5. Apparatus according to claim 1, wherein said inner body constitutes said one body, said electrical inductive heating means being disposed inside of said outer body and adjacent said inner body.

6. Apparatus according to claim 1, wherein said electrical inductive heating means is arranged to heat said one body at a location spaced circumferentially from said discharge position.

7. Apparatus according to claim 6, wherein said electrical inductive heating means is located closer to a leading side of said discharge position than to a trailing side thereof.

8. Apparatus according to claim 1, wherein said discharge position is located at a lowermost portion of said outer body.

9. Apparatus according to claim 1 including a guide body engaging an outer periphery of said outer body for removing residual material from said outer periphery.

10. Apparatus according to claim 9, wherein said guide body is arranged to press residual material back into said openings.

11. Apparatus according to claim 1, wherein said inner body is stationary and includes an inner space for receiving the viscous material, and an apertured exit through which the viscous material can flow, said electrical inductive heating means disposed adjacent an outer periphery of said outer body for heating said outer body.

12. Apparatus according to claim 11, wherein said inner body has a cylindrical outer periphery with a longitudinal axis offset from said axis of rotation.

13. Apparatus according to claim 1, wherein said outer body includes an inner surface having circumferentially spaced, radially inwardly projecting outer slats which extend parallel to said axis of rotation, said circumferentially spaced openings being arranged in respective recesses defined between successive ones of said outer slats, said inner body being mounted for rotation about an additional axis of rotation oriented parallel to and offset from said axis of rotation of said outer body, said inner body including circumferentially spaced, radially outwardly projecting inner slats which extend parallel to said axes of rotation, said inner slats arranged to enter said recesses and push viscous material through said openings.

14. Apparatus according to claim 13, wherein said outer body constitutes said one body, said electrical inductive heating means situated adjacent an outer periphery of said outer body.

15. Apparatus according to claim 14, including an additional electrical inductive heating means disposed within said outer body.

16. Apparatus according to claim 15, wherein said inner body comprises an inductively heatable material, said additional electrical inductive heating means being arranged for heating said inner body.

17. Apparatus according to claim 13, wherein said electrical inductive heating means is disposed within said outer body.

18. Apparatus according to claim 17, wherein said inner body constitutes said one body.

19. Apparatus according to claim 1, wherein said tube includes an inlet portion adjacent a first end of said coil for directing cooling fluid into an interior of said one end of said coil, and an outlet portion adjacent a second end of said coil for directing cooling fluid out of said interior of said coil and conducting said cooling fluid away from said coil.

20. Apparatus for forming drops of a flowable viscous material, comprising:

a tubular outer body rotatable about a longitudinal axis of rotation and having circumferentially spaced openings which successively reach a discharge position during rotation of said outer body, for admitting a downward flow of said material from within said outer body;

said outer body including an inner surface having circumferentially spaced, radially inwardly projecting outer slats which extend parallel to said axis of rotation, said circumferentially spaced openings being arranged in respective recesses defined between successive ones of said outer slats;

an inner body disposed within said outer body and arranged to direct said material to said openings at said discharge position, said inner body being mounted for rotation about an additional axis of rotation oriented parallel to and offset from said axis of rotation of said outer body, said inner body including circumferentially spaced, radially outwardly projecting inner slats which extend parallel to said axes of rotation, said inner slats arranged to enter said recesses and push viscous material through said openings;

each of said bodies comprising an electrical inductively heatable material; and first and second electrical inductive heating means arranged adjacent to said inner and outer bodies, respectively, for inductively heating said inner and outer bodies.

* * * * *